United States Patent
Pattikonda et al.

(10) Patent No.: US 9,817,457 B1
(45) Date of Patent: Nov. 14, 2017

(54) PROGRAMMABLE POWER STRIP FOR CONTROLLING POWER TO ELECTRIC DEVICES

(71) Applicants: Ram Pattikonda, Plano, TX (US); Shariq Hamid, Plano, TX (US)

(72) Inventors: Ram Pattikonda, Plano, TX (US); Shariq Hamid, Plano, TX (US)

( * ) Notice: Subject to any disclaimer, the term of this patent is extended or adjusted under 35 U.S.C. 154(b) by 470 days.

(21) Appl. No.: 14/467,031

(22) Filed: Aug. 24, 2014

(51) Int. Cl.
*H02J 3/14* (2006.01)
*G06F 1/26* (2006.01)
*H02J 3/00* (2006.01)
*H02G 3/18* (2006.01)

(52) U.S. Cl.
CPC ............... *G06F 1/266* (2013.01); *H02G 3/18* (2013.01); *H02J 3/00* (2013.01); *G06F 2200/261* (2013.01); *H02J 3/14* (2013.01); *Y10T 307/461* (2015.04)

(58) Field of Classification Search
USPC .......................................................... 307/39
See application file for complete search history.

(56) References Cited

U.S. PATENT DOCUMENTS

| | | | | |
|---|---|---|---|---|
| 5,424,903 A | * | 6/1995 | Schreiber | G06F 1/266 307/40 |
| 5,506,790 A | * | 4/1996 | Nguyen | G06F 1/3215 307/115 |
| 6,586,849 B2 | | 7/2003 | Tarr | |
| 2010/0176658 A1 | * | 7/2010 | Lai | G06F 1/266 307/39 |
| 2013/0116846 A1 | * | 5/2013 | Galsim | G06F 1/266 700/295 |
| 2013/0226363 A1 | * | 8/2013 | Liu | G06F 1/266 700/297 |

* cited by examiner

*Primary Examiner* — Danny Nguyen
(74) *Attorney, Agent, or Firm* — Michael Diaz

(57) ABSTRACT

A power strip apparatus for powering a plurality of electric devices. The apparatus includes a main body having a plurality of outlets for receiving electric plugs. Each outlet provides power to an electric device attached by an electric plug of the electric device to the outlet. The apparatus also includes a power cable for powering the apparatus from an electric supply and a control board having a programming mechanism for independently controlling power to each outlet of the control board using a plurality of relays. Each relay is associated with a specific outlet to control power to the outlet and attached electric device.

13 Claims, 5 Drawing Sheets

PROGRAMMABLE POWER STRIP FOR CONTROLLING POWER TO ELECTRIC DEVICES

BACKGROUND OF THE INVENTION

Field the Invention

This invention relates to power control systems. Specifically, and not by way of limitation, the present invention relates to a programmable power strip for controlling power to electric devices.

Description of the Related Art

Currently, because of the use of multiple electrical devices, various electronic devices must use multiple electrical outlets for plugging in the power cords of the various electrical devices. Electrical power strips typically have multiple individual outlets that are used to supply AC power to electrical devices. These power strips are ubiquitous devices that are used to power computers, peripherals, TV, appliances etc. These electrical devices often draw small amounts of vampire power while not in use. This small amount of power draw over a long time period is wasted energy that can be conserved. These electrical devices may be printers and speakers connected to computer. DVDs and tuners connected to televisions or other general purpose appliances or lights. Most of these power strips are dummy switch-on power distribution boxes that may have limited intelligence built into them. In addition, some power strips attempt to switch off devices not in use.

Although there are no known prior art teachings of an system or method such as that disclosed herein, a prior art reference that discuss subject matter that bears some relation to matters discussed herein is U.S. Pat. No. 6,586,849 to Tarr (Tarr). Tarr discloses an electrical power strip which is designed for computer connected peripherals. Tarr utilizes voltage from the USB port to switch on the power strip. The peripheral devices are switched on when the computer is on and remain off when the computer is off. Tarr is limited to computer connected peripherals and is useful in saving power only when computer is off.

With all of these existing power strips, they all have limited use in certain applications. These existing power strips do not provide flexible methods to conserve power or control power for automation. Thus, it would be advantageous to have a general purpose power strip that can be programmed in a flexible manner or directly controlled from a computer to switch on power only when needed. It is an object of the present invention to provide such an apparatus.

SUMMARY OF THE INVENTION

In one aspect, the present invention is directed to a power strip apparatus for powering a plurality of electric devices. The apparatus includes a main body having a plurality of outlets for receiving electric plugs. Each outlet provides power to an electric device attached by an electric plug of the electric device to the outlet. The apparatus also includes a power cable for powering the apparatus from an electric supply and a control board having a programming mechanism for independently controlling power to each outlet of the control board using a plurality of relays. Each relay is associated with a specific outlet to control power to the outlet and attached electric device.

DESCRIPTION OF THE INVENTION

Figure 1:
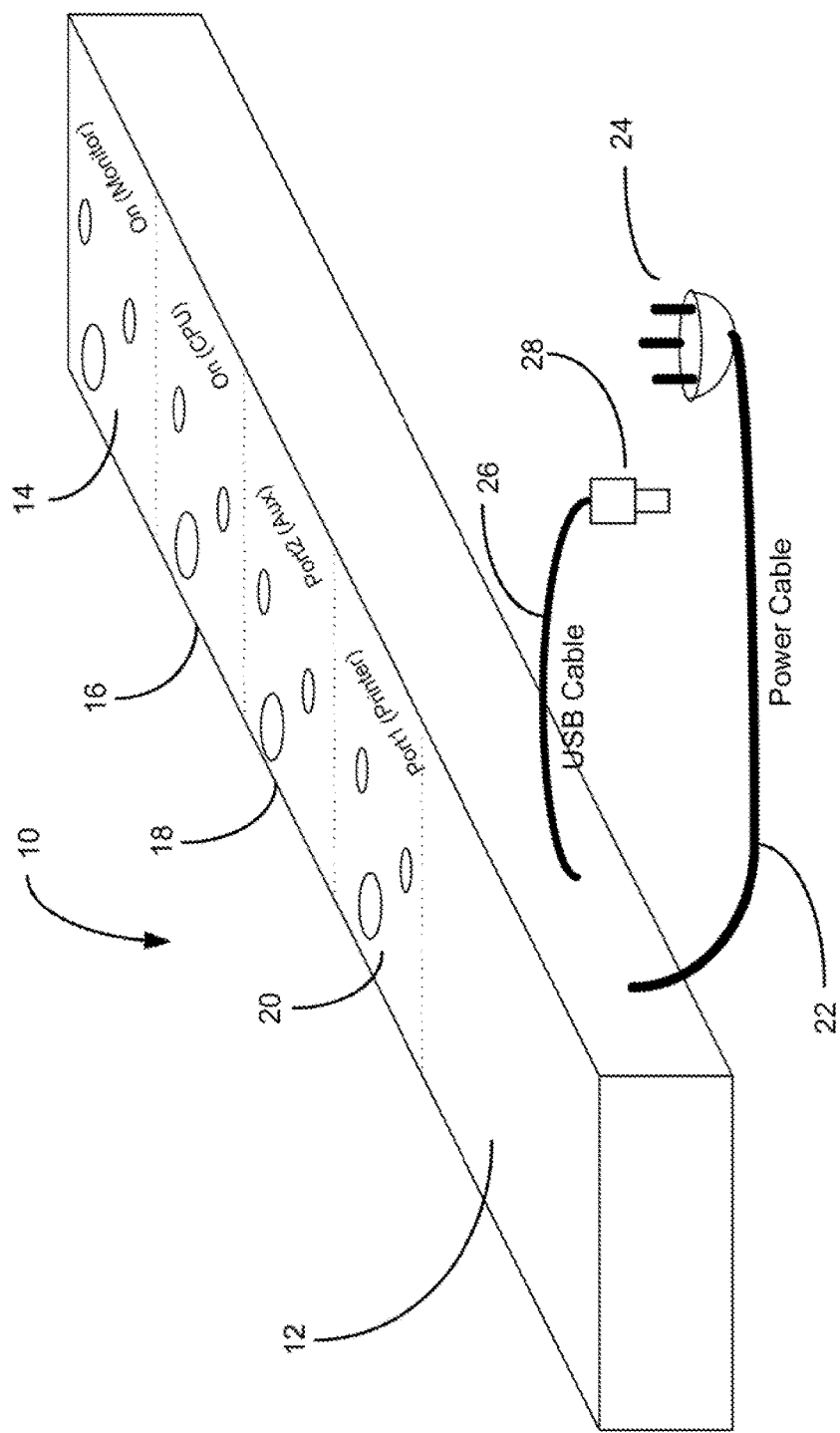
FIG. 1 is a front perspective view of a power strip in one embodiment of the present invention.

The present invention is a programmable power strip for controlling power to electric devices. FIG. 1 is a front perspective view of a power strip 10 in one embodiment of the present invention. The power strip 10 may include a main body 12 having a plurality of outlets 14, 16, 18, and 20. The power strip includes a control board (see FIG. 2) to control power to each or some of the outlets. Although four outlets are illustrated, the present invention may be configured in any manner having two or more outlets. In one embodiment of the present invention, some of the outlets may be "always on" and some of the outlets may be controlled. The controlled outlets are preferably controlled using solid state (SSD) or electro-mechanical (EMR) relays. The micro-controller and embedded software within the power strip controls the power to the controlled outlets using the relays. As depicted in FIG. 1, the "always on" outlets 14 and 16 may be used to power a computer and monitor while the controlled outlets (e.g., outlets 18 and 20) may be used to power a printer and other computer connected peripherals which are sparingly used. In addition, the power strip includes a power cable 22 having a plug 24. The plug is used for plugging into an electrical power outlet to power the power strip 10. In addition, the power strip includes a USB cable 26 having a USB adapter 28 for attachment to a computer or computing device.

Figure 2:
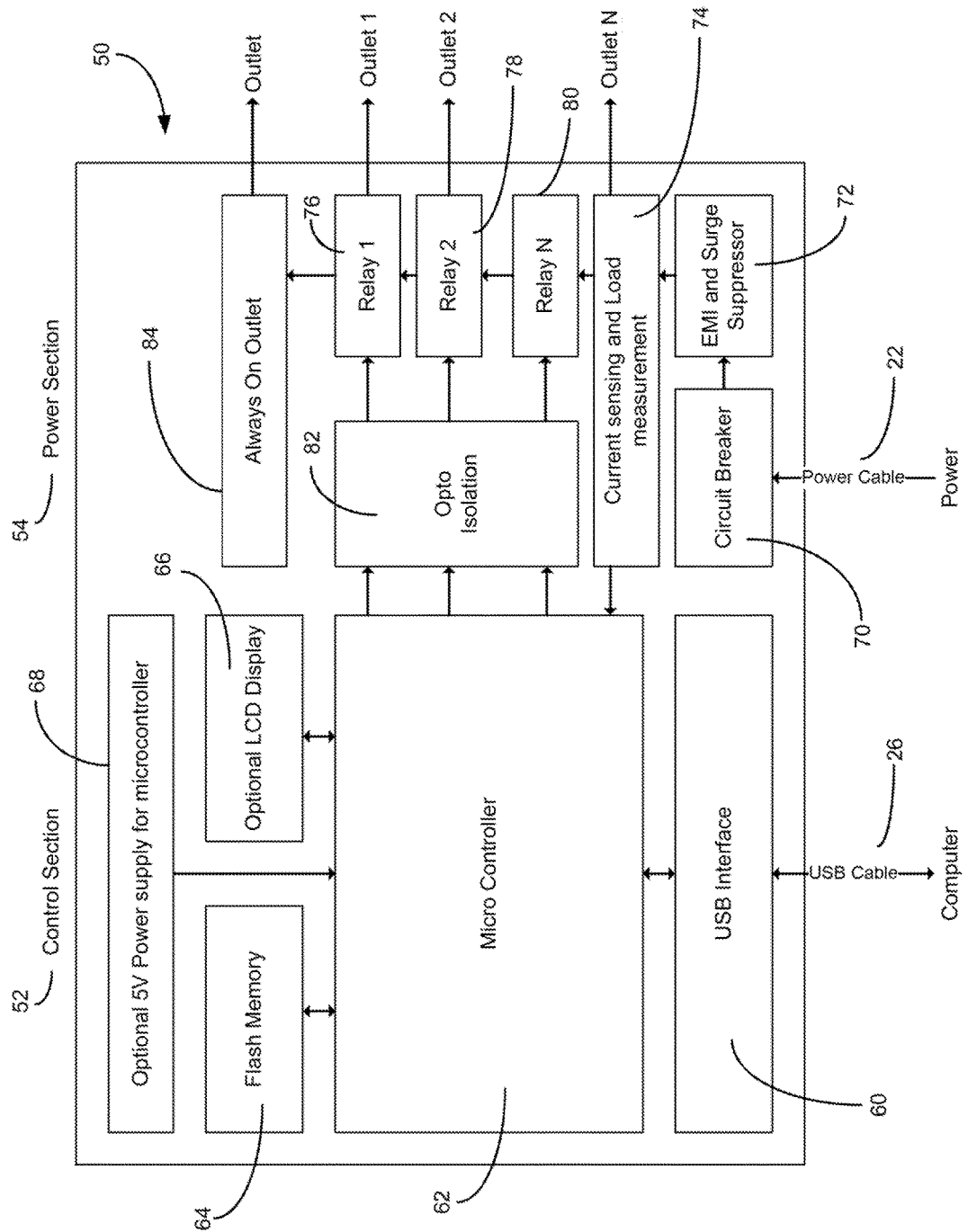
FIG. 2 is a simplified schematic diagram of a USB control board 50 residing in the power strip of FIG. 1.

FIG. 2 is a simplified schematic diagram of a USB control board 50 residing in the power strip 10 of FIG. 1. The control board 50 includes a control section 52 and a power section 54. The control section 52 includes a USB interface 60, a micro-controller 62, flash memory 64, an optional LCD display 66, and an optional 5V power supply 68 for the micro-controller 62. The power section 54 includes one or more circuit breakers 70, an Electromagnetic interference (EMI) and surge suppressor 72, a current sensing and load measurement component 74, a plurality of relays 76, 78, and 80 (solid state or electro-mechanical), an opto-isolator 82, and an optional always on outlet 84. Portions of the power section 54 are coupled to the plurality of outlets 14, 16, 18, and 20.

The power section 54 utilizes the circuit breaker 70 to prevent a power overload. The EMI and surge suppressor 72 enables the receipt of clean power without any voltage spikes. The current sensing and load measurement component 74 measures the current consumed by the attached peripherals. In the case where there is an overload from the peripherals or a short in one or more of the outlets, software within the component 74 detects the overload and switches off the relays and protects the circuit. The protected clean power then flows through controlled and normally on outlets.

The control section 52 uses logic, either built into a program loaded in memory or commands from an attached computer, to switch on/off the controlled outlets. Based on the program, the power strip 10 may be used in at least two different embodiments, in a power strip connected to a computer and a standalone model.

Figure 3:
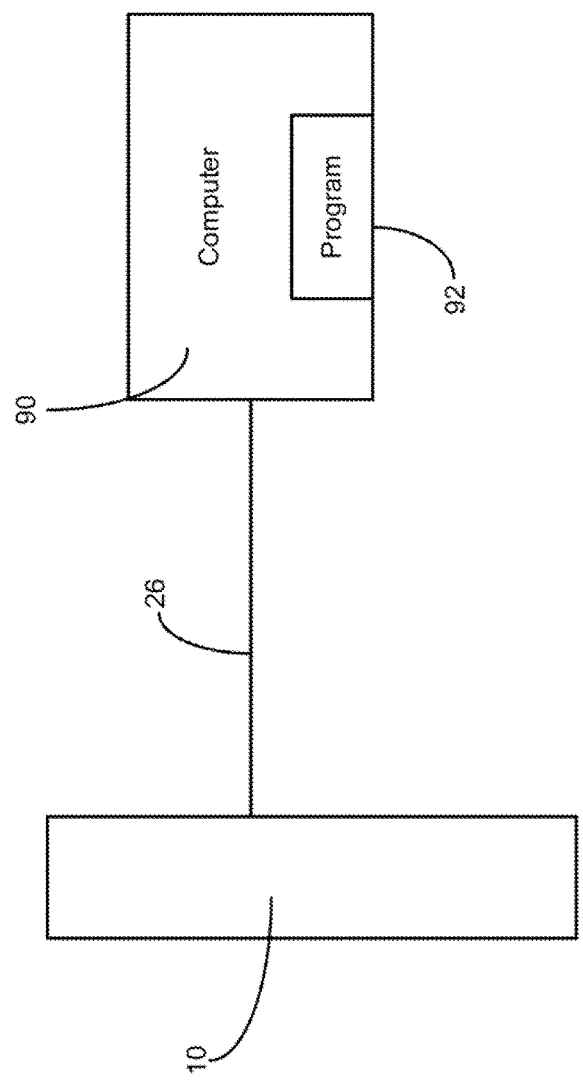
FIG. 3 is a simplified block diagram illustrating the power strip coupled to a computer in one embodiment of the present invention.

FIG. 3 is a simplified block diagram illustrating the power strip 10 coupled to a computer 90 in one embodiment of the present invention. In the computer connected embodiment, the power strip 10 includes controlled outlets 14, 16, 18, and 20 which are preferably controlled only when the power strip is connected to a computer 90 by the USB cable 26 and the USB adapter 28. The computer communicates with the micro-controller 62 through the USB interface 60 and stores the states of outlets in the flash memory 64. The micro-controller 62 uses the state of the memory to switch on the outlets through the relays 76, 78, and 80.

In one embodiment, the relays may be programmed to be in a normally on or off state. When the computer is switched on, the control board receives power through the USB cable port and starts initializing. The control board 50 may look for the default state of the relay in its flash memory. If the computer is on, the power strip switches on all the relays (in turn all outlets). In this mode, the power outlets are switched on when the computer is powered on.

During normal operation, the relays are switched on only when a computer application decides to turn them on. A software program 92 background service decides when to switch on the outlets. This program 92 may reside in the computer or the control board 50. The user can manually switch on any outlet by using a dialog box or hot keys through input to the computer. For example, when the service application detects an entry in a printer queue of the computer (e.g., when the user prints any document), the power strip 10 switches on the printer outlet (e.g., outlet 20) and waits for the completion of the print. The power strip switches off the outlet when there are no print jobs for a period of time. Similarly the user may program the outlet states based on timed events. In addition to saving power by preventing vampire power loss, the power strip provides control to the user to enable power on/off his devices.

Figure 4:
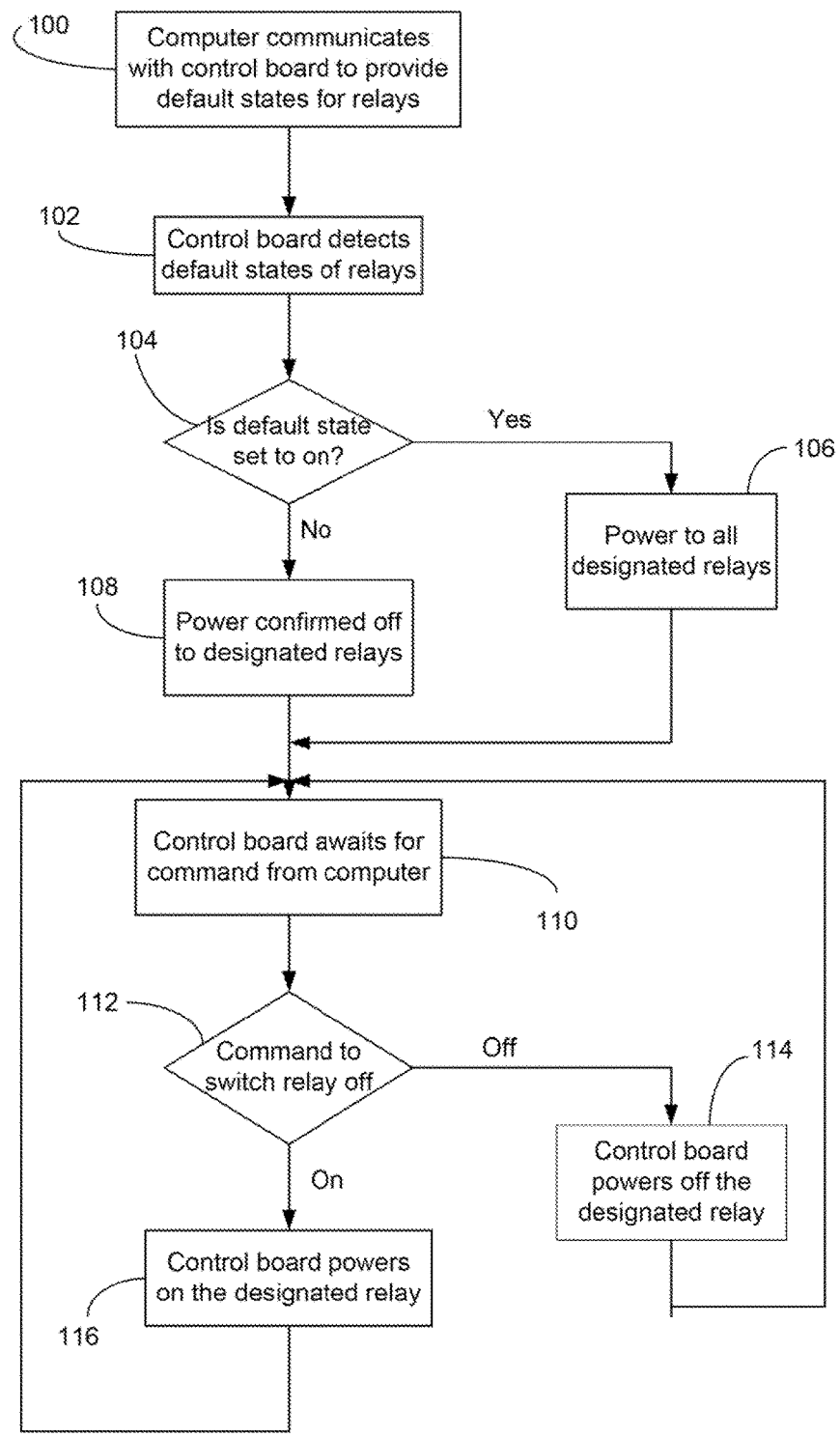
FIG. 4 is a flow chart illustrating the steps of a method of determining a default state of relays according to the teachings of the present invention.

FIG. 4 is a flow chart illustrating the steps of a method of determining a default state of relays according to the teachings of the present invention. With reference to FIGS. 1-4, the method will now be explained. The method begins in step 100 where the computer 90 communicates with the micro-controller 62 through the USB interface 60 and stores the default states of one or more outlets in flash memory. Next, in step 102, the control board detects a default state of each relay stored in its flash memory. In step 104, it is determined if the default state is set to on. If the default state is set to on, the method moves to step 106 wherein power is applied to all relays for its corresponding outlet which have been set to on. The method then moves to step 110.

However, in step 106, if it is determined that the default state is set to off, the method moves to step 108 wherein the control board 50, through the micro-controller 62, confirms that the power is off to all designated relays corresponding to the outlets. The method then moves to step 110.

In step 110, the control board awaits a command from the computer 90. In step 112, it is determined if the control board 50 receives a command to switch a relay to on or off. If it is determined in step 112, that a command is received to switch a relay off, the method moves to step 114 where the control board powers off the designated relay in the computer command. The method then moves to step 110. However, in step 112, if it is determined that a command is received to switch a relay on, the method moves to step 116 where the control board powers the designated relay. The method then moves back to step 110.

In the second embodiment, the power strip is a standalone model which may be used while attached to the computer or separated from the computer. In this embodiment, the control board preferably includes the 5V DC power supply 68 to power the micro-controller 62. This power supply ensures that the power strip is functional even when not connected to computer. In addition to having all the features of the computer connected model, the system may include several modes of operation, the programmed timed power control mode, smart monitor power control mode, the manual mode, and the watchdog mode.

In the programmed timed power control mode, the control board 50 may include a stored table of on-times and off-times. When connected to the computer, the on/off times may be programmed and downloaded to the control board memory. The micro-controller may utilize this table to determine when to switch on and off the controlled outlets. Each outlet may include its own table. The appliances and lights may be switched off during office hours and switched on only in the evenings and weekends, thus saving vampire power in residences during office hours. The offices may program to switch on the outlets only during office hours.

In the smart monitor power control mode, the load on the outlets may be monitored. When a large load is detected by the control board in "always on" outlets, the controlled outlets are switched on. When the load on the "always on" outlet is reduced, the controlled outlets may be switched off. Using this embodiment, the DVD and other TV connected devices are kept in the off mode. The DVD and other TV devices are powered on only when the TV is switched on, thus saving power and increasing the life of the TV connected devices.

In the manual mode, a reset button (not shown) may be used to switch on/off the controlled outlets. The micro-controller 62 may check the input from the reset switch to change the state of the controlled outlets.

In the standalone mode, the power strip 10 may be programmed to be used as a monitoring watchdog device. A connected device, such as a computer, is powered through one of the controlled outlets. The device is programmed to expect a heartbeat from the attached computer with a designated frequency. If the control board does not receive this heartbeat, the control board assumes that the attached computer is hung-up and resets power to the attached computer. This power reset is conducted by powering-off the attached computer and then re-powering on the computer. The power reset would be delayed for certain number of heartbeat misses before accomplishing the power reset. Once reset, the power strip would start the new monitoring only after receiving a new "start watchdog command" from the computer, thus preventing a continuous power recycle on a "hung-up" computer. This monitoring and reset feature of the power strip increases the reliability of remote computers that need to be on all the time. By utilizing this mode, hung-up computers are reset without any manual intervention.

Figure 5:
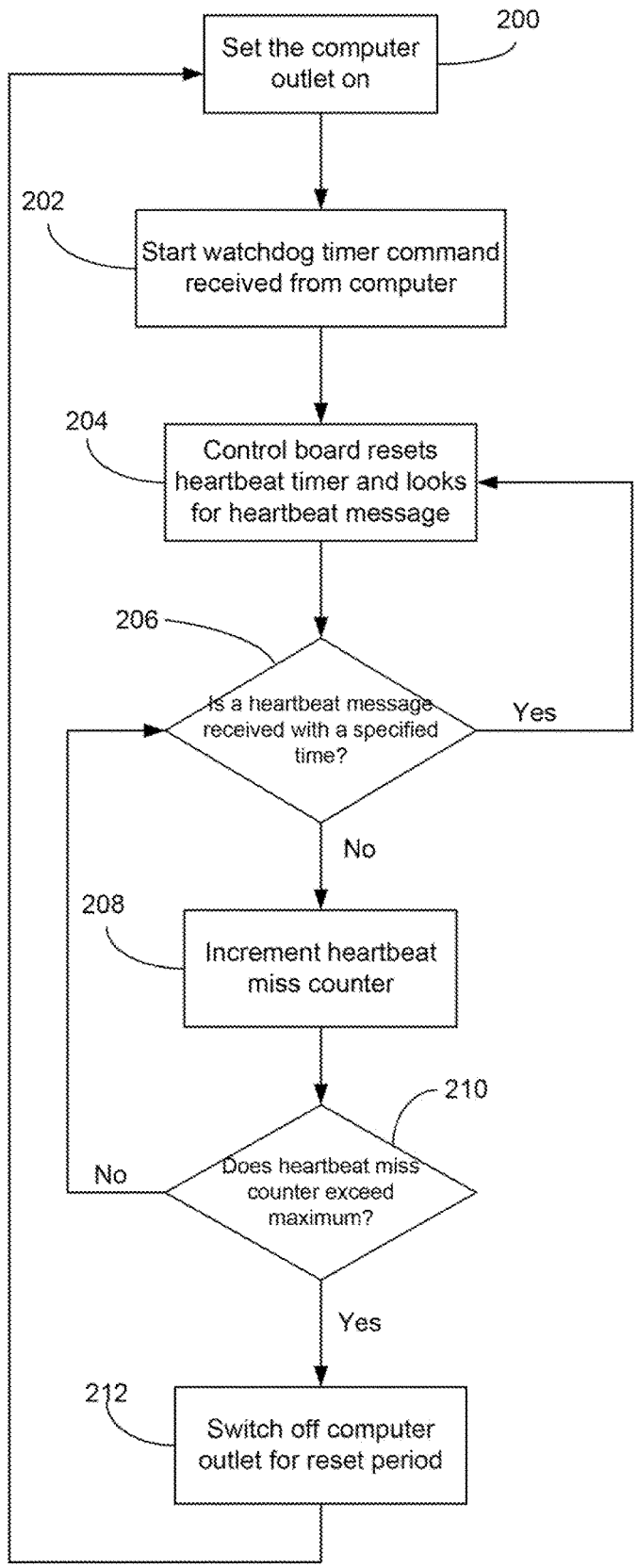
FIG. 5 is a flow chart illustrates the steps of a method of using a watchdog mode for the power strip according to the teachings of the present invention.

FIG. 5 is a flow chart illustrates the steps of a method of using a watchdog mode for the power strip 10 according to the teachings of the present invention. With reference to FIGS. 1-3 and 5, the method will now be explained. The method begins with step 200 where the outlet 16 powering the computer 90 is set to on. Next, in step 202, a start watchdog timer command is received from the computer 90 with specified parameters. The parameters may include a time interval of sending heartbeat messages, a maximum amount of heartbeat misses prior to reset, and a time delay prior to commencing a power reset. The method then moves to step 204, where a reset heartbeat timer in the control board is reset and the control board looks for a heartbeat message sent from the computer. The heartbeat message is sent by the computer to indicate that the computer is functioning properly. Without receiving this message, the message provides an indication that the computer is not operating correctly. The method then moves to step 206 where it is determined if a heartbeat message is received within a specified time period. If the heartbeat message is received by the control board, the method moves back to step 204 where the timer is reset.

However, in step 206 if it is determined that the heartbeat message is not received within the specified period, the method moves to step 208 where a heartbeat miss counter is incremented. In step 210, it is determined if the heartbeat miss counter exceeds a designated maximum. If it is determined by the control board that a designated maximum is not exceeded, the method moves back to step 206. If in step 210 it is determined that the heartbeat miss counter exceeds the designated maximum, the method moves to step 212 where the outlet powering the computer is powered off after a reset time delay. The method then moves back to step 200.

The present invention provides many advantages over existing power strips. The present invention provides a programmable power strip capable of powering a plurality of electrical devices. The present invention may be utilized in either a computer connected embodiment or a standalone embodiment. The present invention enables the designation of when to power specified outlets for powering specific electric devices. In addition, the present invention provides the capability of resetting an electrical device, such as a computer, without manual intervention. The present invention also provides a user programmed power strip to control electrical devices either through the power strip or a computer.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A power strip apparatus for powering a plurality of electric devices, the apparatus comprising:

a main body having a plurality of outlets for receiving electric plugs, each outlet providing power to an electric device attached by an electric plug of the electric device to the outlet;

a power cable for powering the power strip apparatus from an electric supply; and a control board having programming means for independently controlling power to each outlet, the control board using a plurality of relays with each relay being associated with a specific outlet to control power to the outlet and attached electric device;

wherein the power strip apparatus is connected to a computer providing programming commands to the control board;

wherein the computer commands are based on user provided parameters through a computer program;

wherein each relay includes a default on/off state stored in the control board;

wherein the computer searches the control board for default states of relays and commands the relays to the default on/off state.

2. The power strip apparatus according to claim 1 wherein the control board controls power to each outlet through a micro-controller providing commands to the relays.

3. The power strip apparatus according to claim 1 wherein the plurality of relays are solid state relays.

4. The power strip apparatus according to claim 1 wherein the plurality of relays are mechanical relays.

5. The power strip apparatus according to claim 1 wherein the power strip apparatus is connected to the computer through a USB interface.

6. The power strip apparatus according to claim 1 wherein the default state of each relay is stored in a flash memory of the control board.

7. The power strip apparatus according to claim 1 wherein the commands are based on timed events for each outlet.

8. The power strip apparatus according to claim 1 wherein power is always provided to a designated outlet.

9. The power strip apparatus according to claim 8 wherein when the control board detects powered being used at the designated outlet, commanding a relay to provide power to a second outlet.

10. The power strip apparatus according to claim 1 wherein the power strip apparatus includes a watchdog mode where a heartbeat message is periodically sent by the computer to the control board and the control board resets power to a designated outlet when the heartbeat message is not received within a specified time period.

11. The power strip apparatus according to claim 1 wherein the plurality of outlets includes at least one controlled outlet controlled by the control board and a second always on outlet which always is provided power by the power strip apparatus.

12. The power strip apparatus according to claim 11 wherein when the control board detects a load increase to the always on outlet, the controlled outlet is turned on to allow power to an electric device connected to the controlled outlet.

13. The power strip apparatus according to claim 1 wherein the control board includes a surge protector for preventing surges to connected electric devices.

* * * * *